United States Patent [19] [11] 3,875,482
Noguchi [45] Apr. 1, 1975

[54] CHARGING CONTROL DEVICE
[75] Inventor: Koichi Noguchi, Tokyo, Japan
[73] Assignee: Ricoh Co., Ltd., Tokyo, Japan
[22] Filed: Apr. 12, 1973
[21] Appl. No.: 350,361

[30] Foreign Application Priority Data
Apr. 19, 1972 Japan.............................. 47-39827

[52] U.S. Cl............................................ 317/262 A
[51] Int. Cl. .......................................... H01t 19/04
[58] Field of Search ................... 317/4, 262 A, 2, 3

[56] References Cited
UNITED STATES PATENTS
3,714,531   1/1973   Takahashi...................... 317/262 A

*Primary Examiner*—L. T. Hix
*Attorney, Agent, or Firm*—Cooper, Dunham, Clark, Griffin & Moran

[57] ABSTRACT

A device comprising a circuit for permitting either a positive or a negative component of an alternating current voltage to flow from corona discharge electrodes to an opposite electrode plate disposed in spaced juxtaposed relationship, and another circuit for permitting the other component thereof to flow in a predetermined value from the corona discharge electrodes to the opposite electrode plate, whereby an object disposed between the corona discharge electrodes and the opposite electrode plate can be controllably charged.

4 Claims, 2 Drawing Figures

1

CHARGING CONTROL DEVICE

BACKGROUND OF THE INVENTION

This invention relates to a charging control device which may have application as a charging device or charge removal device.

Heretofore, a charging device shown in FIG. 1 generally referred to as Scolotron has been in use. The device comprises corona discharge electrodes 12 enclosed by a shield frame 11 and an opposite electrode plate 13 disposed in spaced juxtaposed relationship, and a direct current power source 14 interposed between the corona discharge electrodes 12 and the opposite electrode plate 13. A control grid electrode 15 comprising a multitude of fine wires arranged parallel to one another is interposed between the corona discharge electrodes 12 and the opposite electrode plate 13, and another direct current power source 16 is connected between the control grid electrode 15 and the opposite electrode plate 13.

The DC power source 16 supplies a voltage output which is of the same polarity as and lower in value than a voltage output supplied by the DC power source 14, and which is set at a value corresponding to the level of electric charges which an object 17 to be charged is desired to carry. The DC power sources 14 and 16 each comprise a circuit for rectifying and smoothing the output of a commercial alternating current power source by means of a diode and capacitor. The object 17 to be charged is interposed between the control grid electrode 15 and the opposite electrode plate 13. As a corona discharge takes place between the corona discharge electrodes 12 and the opposite electrode plate 13 through the control grid electrode 15 and the object 17 to be charged, the object 17 is electrically charged.

Although the charging device as aforementioned offers the advantage of placing limitations on the level of electric charges to be carried by the object 17 to be charged by virtue of the presence of the control grid electrode 15 and the DC power source 16, the use of the control grid electrode 15 renders the construction of the device complex. In addition, the use of the DC power source using a diode and a capacitor renders the device complex in construction and high in production cost.

SUMMARY OF THE INVENTION

This invention obviates the aforementioned disadvantages of the prior art. Accordingly, the invention has as its object the provision of a charging control device which permits either a positive or a negative component of an alternating current voltage to flow from corona discharge electrodes to an opposite electrode plate disposed in spaced juxtaposed relationship and which also permits the other component to flow in a predetermined value from the corona discharge electrodes to the opposite electrode plate to effect control of charging of an object.

The invention eliminates the need to use a control grid electrode and a power source therefor which have been used with a conventional charging control device. The charging control device according to the invention offers the advantages of being simple in construction and low in cost.

DESCRIPTION OF A PREFERRED EMBODIMENT

Figure 1:
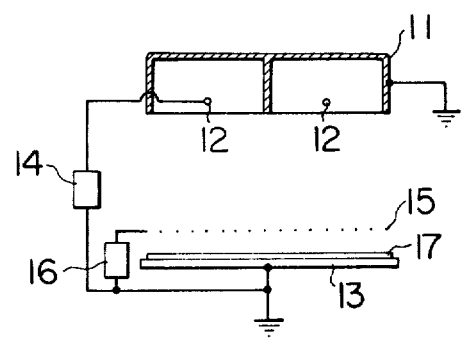
FIG. 1 is a diagram of a charging control device of the prior art.
Figure 2:
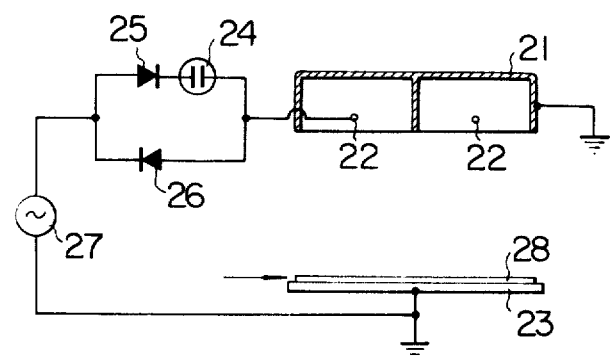
FIG. 2 is a diagram of the charging control device comprising one embodiment of the invention.

FIG. 2 shows one embodiment of the invention in which corona discharge electrodes 22 are disposed in a shield frame 21 and juxtaposed to an opposite electrode plate 23 in spaced relationship through an opening formed in the frame 21 which is grounded. The corona discharge electrodes 22 are connected, through a constant voltage passive element or constant voltage discharge tube 24, for example, to the cathode of a diode 25 and the anode of a diode 26.

The constant voltage passive element has a constant voltage characteristic so that the voltage between the two terminals does not exceed a predetermined level. It may be in the form of a constant voltage diode or ZNR (trade name) which is a varistor made of zinc oxide.

The anode of diode 25 and the cathode of diode 26 are connected to one end of an alternating current power source 27 which is grounded at the other end together with the opposite electrode plate 23.

An object 28 to be controllably charged is interposed between the corona discharge electrodes 22 and the opposite electrode plate 23. When the device according to the invention is used as a charging device for electrophotographic copying apparatus, the object 28 is a photoreceptor which may comprise a conductive supporter and an organic photoconductive material layer formed on the supporter.

In operation, such photoreceptor moves on the opposite electrode plate 23 with its organic photoconductive material layer facing the corona discharge electrodes 22. A positive half-cycle component of an AC voltage from the AC power source 27 is supplied through the diode 25 and constant voltage discharge tube 24 to the corona discharge electrodes 22, and a negative half-cycle component thereof is supplied to the corona discharge electrodes 22 through the diode 26. A corona discharge takes place between the corona discharge electrodes 22 and the opposite electrode plate 23 through the photoreceptor 28 interposed therebetween, whereby the organic photoconductive material layer of the photoreceptor 28 can be charged and made to carry electric charges of a desired level.

The diode 26 is fired during the negative half-cycle of the AC voltage from the AC power source 27 so that the negative component of the AC voltage is applied as it is to the corona discharge electrodes 22 and the organic photoconductive material layer is negatively charged. The positive component of the AC voltage from the AC power source 27 is applied to the corona discharge electrodes 22 through the diode 25 and constant voltage discharge tube 24 during the positive half-cycle of the AC voltage from the AC power source 27, and a current flows from the corona discharge electrodes 22 to the shield frame 21, so that the positive component of the constant voltage level of the constant voltage discharge tube 24 is supplied to the corona discharge electrodes 22.

Accordingly, when electric charges carried by the organic photoconductive material layer of the photoreceptor 28 are at a low level, a corona discharge current does not flow to the photoreceptor 28 during the positive half-cycle but flows during the negative half-cycle so as to negatively charge the organic photoconductive material layer of the photoreceptor 28.

When negative electric charges carried by the organic photoconductive material layer of the photoreceptor 28 are at a high level, the potential difference between the corona discharge electrodes 22 to which the positive component is applied during the positive half-cycle and the organic photoconductive material layer of the photoreceptor 28 increases, so that a corona discharge current flows to the photoreceptor 28. Thus, positive charges are supplied to the negatively charged organic photoconductive material layer of the photoreceptor 28 so as to cancel out the negative charges.

The level of electric charges carried by the organic photoconductive material layer of the photoreceptor 28 is raised till the positive charges and the negative charges supplied during the negative half-cycle balance, and does not go beyond the level reached when the positive and negative charges balance.

The level of electric charges carried by the organic photoconductive material layer of the photoreceptor 28 may vary depending on the constant voltage value of the constant voltage discharge tube 24. The electric charges carried by the photoreceptor 28 can thus be adjusted to any level as desired by selecting a suitable constant voltage value for the constant voltage discharge tube 24.

In electrophotographic copying apparatus, the organic photoconductive material layer of the photoreceptor 28 made to carry electric charges of a desired level in this way is exposed to an optical image of an original to be duplicated, and electric charges carried by exposed portions of the organic photoconductive material layer are discharged through the conductive support of the photoreceptor 28, whereby an electrostatic latent image of the original can be formed on the photoreceptor 28 subsequently to be developed and fixed.

The invention has been shown and described with reference to an embodiment in which the object 28 is negatively charged. It is to be understood, however, that the object 28 can be positively charged if the arrangement of the diodes 25 and 26 is reversed. Similar results can be achieved to all intents and purposes by using a resistor in place of the constant voltage passive element. Also, if the voltage of the constant voltage passive element is set such that the level of electric charges carried by the object 28 is zero volt, electric charges carried by the object 28 can be removed by placing it between the corona discharge electrodes and the opposite electrode plate. Thus the device can be used as a charge removal device.

What is claimed is:

1. A device for controllably charging an object comprising corona discharge electrodes and an opposite electrode plate disposed in spaced juxtaposed relationship, a circuit for permitting either a positive element or a negative element of an AC voltage from an AC power source to flow from said corona discharge electrodes to said opposite electrode plate, and a circuit for permitting the other component of the AC voltage to flow in a predetermined value from the corona discharge electrodes to the opposite electrode plate whereby an object interposed between the corona discharge electrodes and the opposite electrode plate can be controllably charged, said circuit for permitting either a positive element or a negative element of an AC voltage from an AC power source to flow from said corona discharge electrodes to said opposite electrode plate consisting of a constant voltage passive element and a diode.

2. A device according to claim 1 wherein said constant voltage passive element is a constant voltage discharge tube.

3. A device according to claim 1 wherein said constant voltage passive element is a constant voltage diode.

4. A device according to claim 1 wherein said circuit for permitting the other component of the AC voltage to flow in a predetermined value from the corona discharge electrodes to the opposite electrode plate consists of a diode.

* * * * *